(12) United States Patent
Fu et al.

(10) Patent No.: US 10,496,124 B1
(45) Date of Patent: Dec. 3, 2019

(54) PROJECTOR AND ADJUSTING ASSEMBLY

(71) Applicant: Coretronic Corporation, Hsin-Chu (TW)

(72) Inventors: Mao-Min Fu, Hsin-Chu (TW); I-Hsien Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/048,352

(22) Filed: Jul. 30, 2018

(51) Int. Cl.
*G03B 21/00* (2006.01)
*G05G 1/12* (2006.01)
*G03B 21/14* (2006.01)

(52) U.S. Cl.
CPC ............. *G05G 1/12* (2013.01); *G03B 21/142* (2013.01)

(58) Field of Classification Search
CPC . H01H 19/14; G03B 3/00; G03B 3/02; G03B 21/14; G03B 21/142; G03B 21/145; G03B 21/147; G02B 7/04; G05G 1/12
See application file for complete search history.

(56) References Cited

U.S. PATENT DOCUMENTS

| | | | | |
|---|---|---|---|---|
| 5,388,307 A | * | 2/1995 | Hyde | G05G 1/12 16/441 |
| 5,954,192 A | * | 9/1999 | Iitsuka | H01H 19/11 200/336 |
| 2004/0007450 A1 | * | 1/2004 | Kojima | G05G 1/10 200/564 |
| 2009/0185145 A1 | * | 7/2009 | Kitahara | G03B 3/00 353/101 |
| 2014/0092370 A1 | * | 4/2014 | Nemura | G03B 21/142 353/101 |
| 2015/0122627 A1 | * | 5/2015 | Pora | H01H 19/08 200/572 |
| 2017/0010522 A1 | | 1/2017 | Shen et al. | |

\* cited by examiner

*Primary Examiner* — Cara E Rakowski
*Assistant Examiner* — Christopher A Lamb, II
(74) *Attorney, Agent, or Firm* — JCIPRNET (57) ABSTRACT

A projector includes a main body and an adjusting assembly. The main body includes a casing, a light source, a light valve, and a projection lens. The casing has an opening. The adjusting assembly includes a rotation shaft, a knob, and at least one fastening component. The rotation shaft is connected to the main body. The knob is disposed on the rotation shaft and located in the opening. One of the rotation shaft and the knob has at least one fastening hole. The at least one fastening component penetrates the at least one fastening hole and is fixed to another one of the rotation shaft and the knob. An inner diameter of the at least one fastening hole is larger than an outer diameter of the at least one fastening component.

20 Claims, 8 Drawing Sheets

PROJECTOR AND ADJUSTING ASSEMBLY

BACKGROUND

Technical Field

The present invention relates to a display apparatus and an adjusting assembly thereof, and in particular to a projector and an adjusting assembly thereof.

Description of Related Art

A projection apparatus is a display apparatus for generating a large-sized image. An imaging principle of the projection apparatus is to covert, by using a light valve, an illumination beam generated by a light source into an image beam, and then project, by using a projection lens, the image beam onto a display screen or a wall surface.

In order to adjust the image beam projected by the projection lens to be located at a predetermined position on the display screen or the wall surface, the projector includes an adjusting knob thereon. Generally, the adjusting knob is connected to a rotation shaft, which is used to drive the projection lens to move, and a casing of the projector has an opening to expose the adjusting knob. However, the adjusting knob and the opening may be imperfectly aligned with each other due to manufacture and assembly tolerance. As a result, the adjusting knob is easily to be interfered with the inner edge of the opening, and the operation of the adjusting knob is impeded.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a projector and an adjusting assembly, wherein a knob of the adjusting assembly is able to be accurately aligned with an opening of a casing of the projector.

A projector of the invention includes a main body and an adjusting assembly. The main body includes a casing, a light source, a light valve, and a projection lens. The casing has an opening. The light source is disposed in the casing, and adapted to provide an illumination beam. The light valve is disposed in the casing, located at a transmitting path of the illumination beam, and adapted to convert the illumination beam into an image beam. The projection lens is disposed in the casing, located at a transmitting path of the image beam, and adapted to project the image beam out of the projector. The adjusting assembly includes a rotation shaft, a knob, and at least one fastening component. The rotation shaft is connected to the main body. The knob is disposed on the rotation shaft and located in the opening. One of the rotation shaft and the knob has at least one fastening hole. The at least one fastening component penetrates the at least one fastening hole and is fixed to another one of the rotation shaft and the knob. An inner diameter of the at least one fastening hole is larger than an outer diameter of the at least one fastening component.

An adjusting assembly of the invention includes a rotation shaft, a knob, and at least one fastening component. The knob is disposed on the rotation shaft. One of the rotation shaft and the knob has at least one fastening hole. The at least one fastening component penetrates the at least one fastening hole and is fixed to another one of the rotation shaft and the knob. An inner diameter of the at least one fastening hole is larger than an outer diameter of the at least one fastening component.

Based on the above, in the adjusting assembly of the embodiment of the invention, the inner diameter of the fastening hole is designed to be larger than the outer diameter of the fastening component, so as to enable the knob to move relatively to the rotation shaft via a displacement of the fastening component within the fastening hole. By doing this, even if the knob and the opening of the casing are imperfectly aligned with each other after the adjusting assembly is assembled to the main body of the projector, the knob may be slid relatively to the rotation shaft through a force applied by an user to be accurately aligned with the opening, and the knob is prevented from being interfered with an inner edge of the opening.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
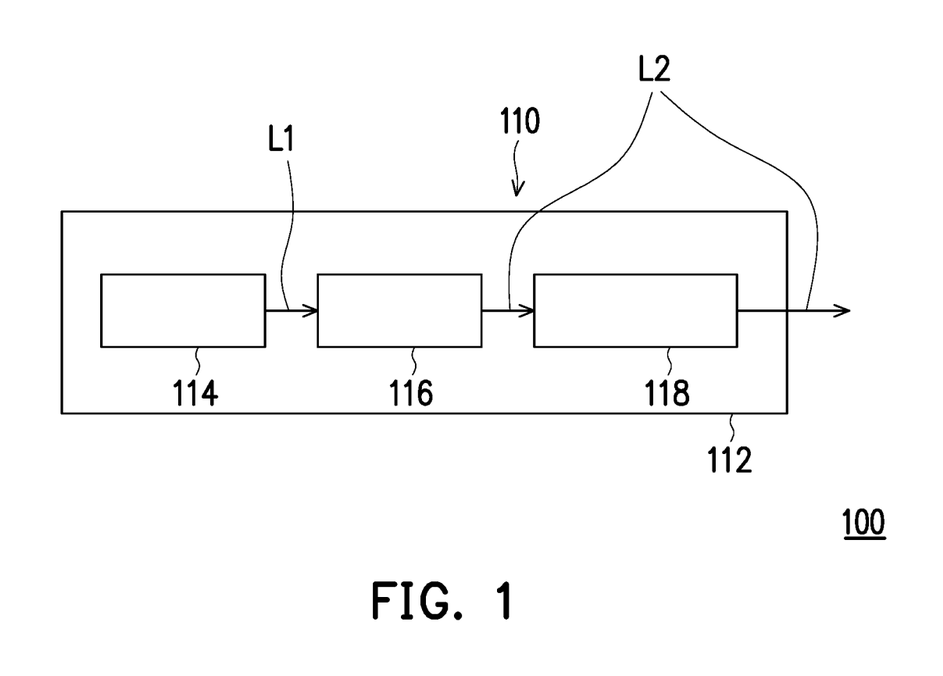
FIG. 1 is a schematic view of a projector according to an embodiment of the invention.

FIG. 1 is a schematic view of a projector according to an embodiment of the invention. With reference to FIG. 1, in the embodiment, a projector 100 includes a main body 110, and the main body 110 includes a casing 112, a light source 114, a light valve 116, and a projection lens 118. The light source 114 is disposed in the casing 112 and adapted to provide an illumination beam L1. The light valve 116 is disposed in the casing 112, located at a transmitting path of the illumination beam L1, and adapted to convert the illumination beam L1 into an image beam L2. In the embodiment, the light valve 116 may be a digital micro-mirror device (DMD), a liquid crystal on silicon (LCoS) substrate or a liquid crystal display (LCD) substrate, but is not limited thereto. The projection lens 118 is disposed in the casing 112, located at a transmitting path of the image beam L2, and adapted to project the image beam L2 out of the projector 100.

Figure 2:
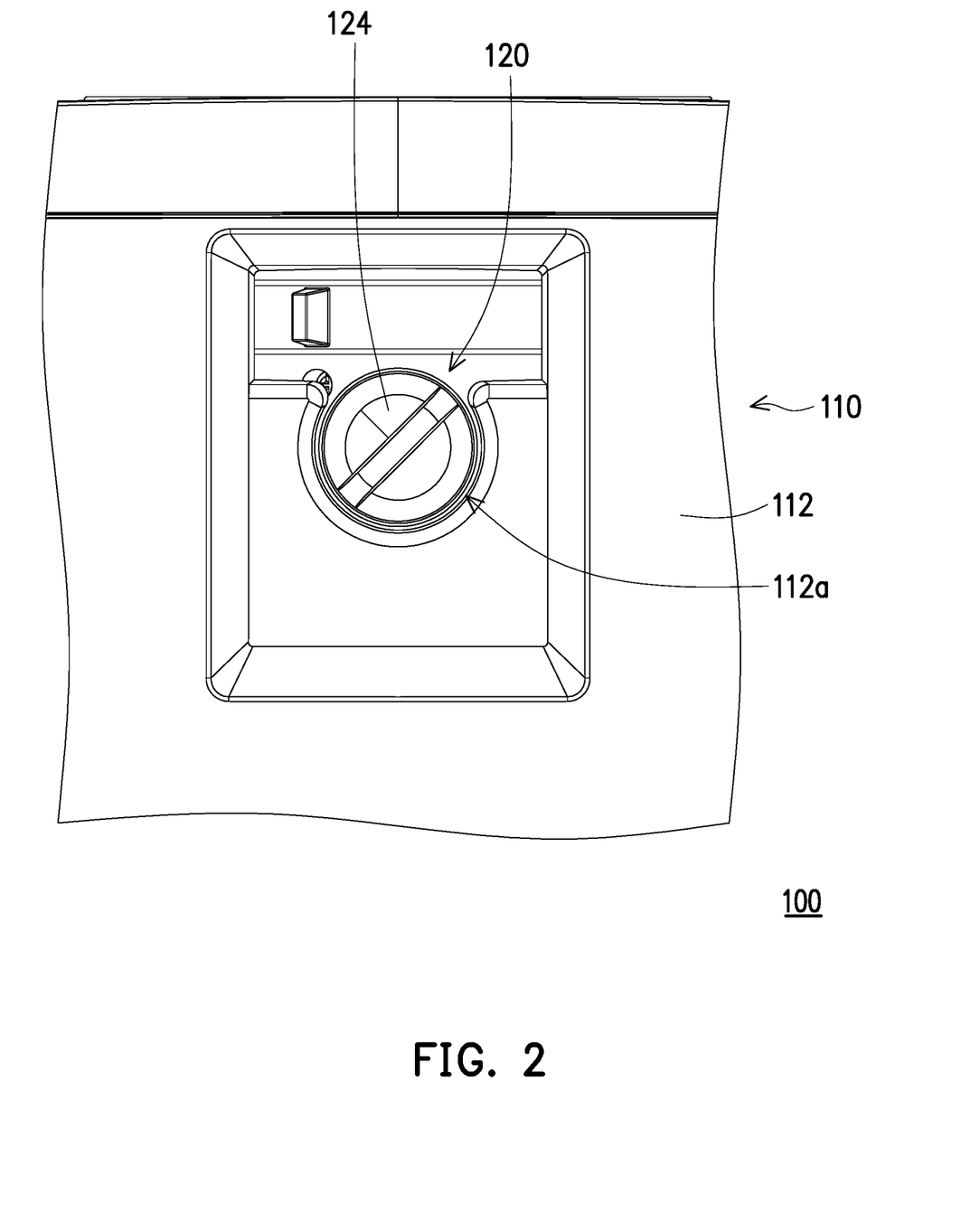
FIG. 2 is a partial top view of the projector of FIG. 1.
Figure 3:
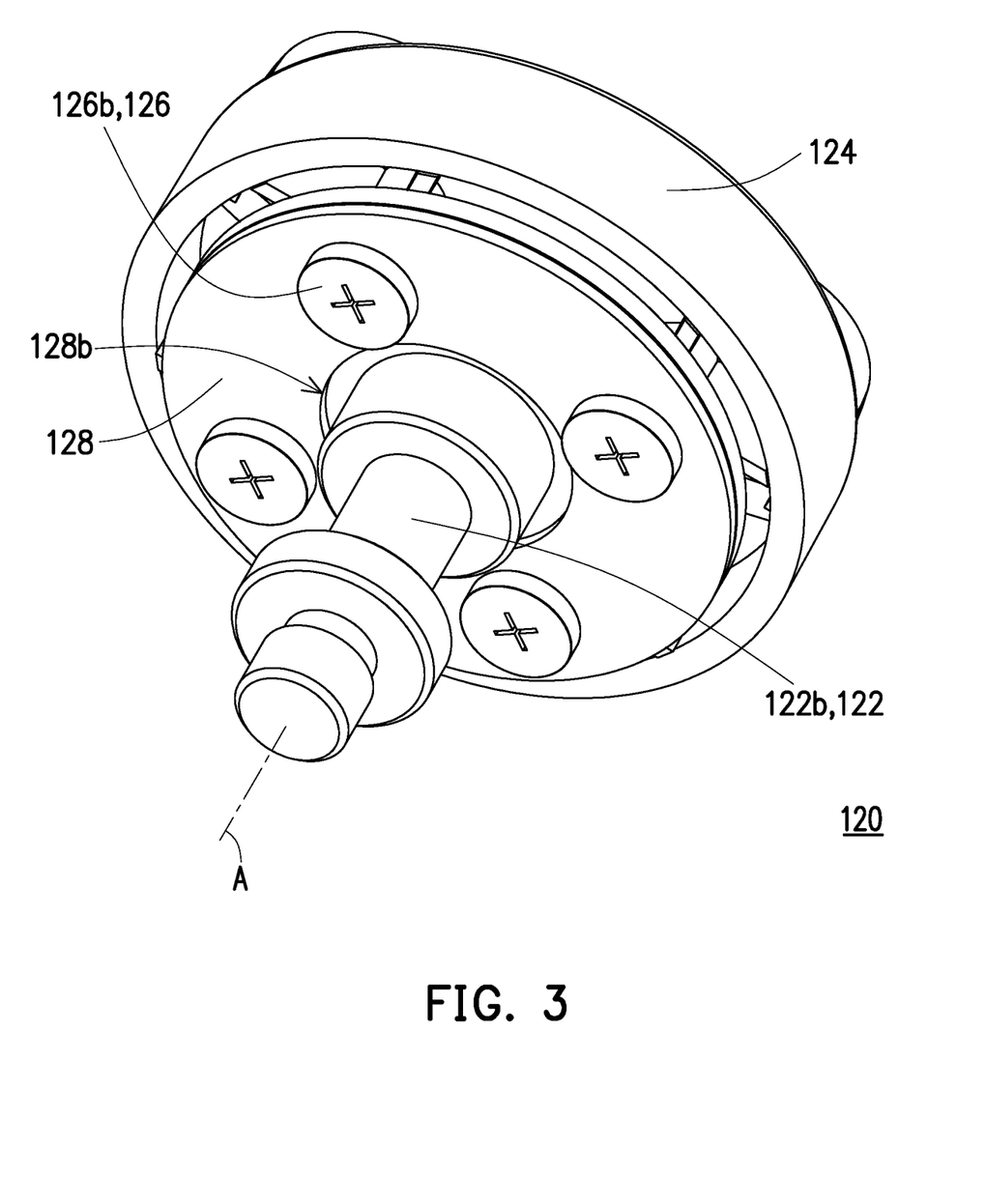
FIG. 3 is a schematic view of the adjusting assembly of FIG. 1.
Figure 4:
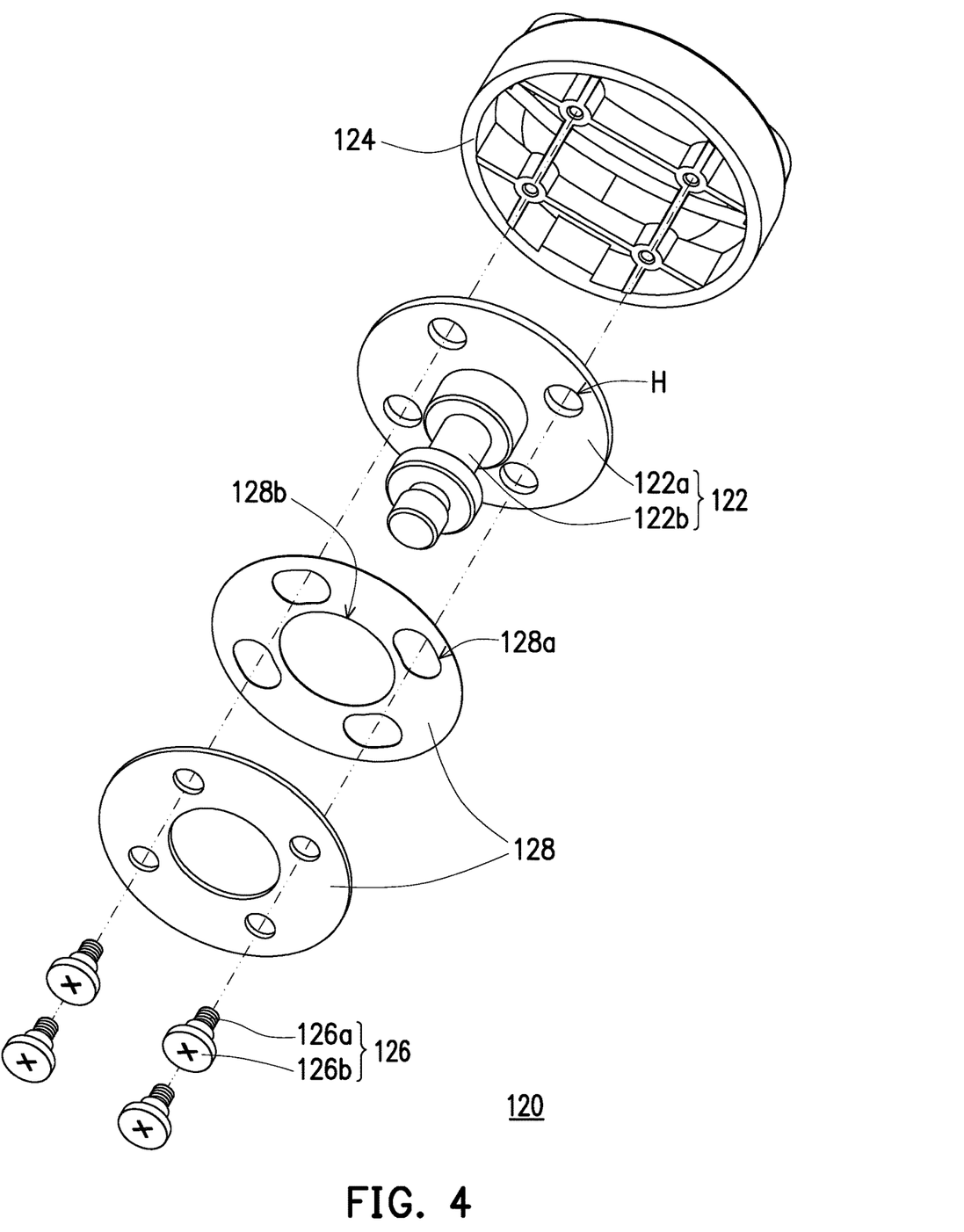
FIG. 4 is an exploded view of the adjusting assembly of FIG. 1.

FIG. 2 is a partial top view of the projector of FIG. 1. FIG. 3 is a schematic view of the adjusting assembly of FIG. 1. FIG. 4 is an exploded view of the adjusting assembly of FIG. 1. Referring to FIG. 2 to FIG. 4, the projector 100 further includes an adjusting assembly 120, and the casing 112 has an opening 112a corresponding to the adjusting assembly 120. In detail, the adjusting assembly 120 includes a rotation shaft 122, a knob 124, and at least one fastening component (a plurality of fastening components 126 shown in FIGS. 3-4 for example). The rotation shaft 122 is connected to the projection lens 118 (shown in FIG. 1) of the main body 110. The knob 124 is disposed on the rotation shaft 122 and located in the opening 112a of the casing 112. A periphery of the knob 124 is at least partially surrounded by an inner edge of the opening 112a. The knob 124 is adapted to drive the rotation shaft 122 to rotate, so as to drive the projection lens 118 to move via the rotation shaft 122, for adjusting the position of the projection lens 118.

In the embodiment, the rotation shaft 122 has at least one fastening hole (a plurality of fastening holes H shown in FIG. 4 for example), and each fastening component 126 penetrates the corresponding fastening hole H along a direction parallel to a rotation axis A of the rotation shaft 122 and is fixed to the knob 124, however the invention is not limited thereto. In one embodiment, an inner diameter of the at least one fastening hole H is designed to be larger than an outer diameter of the corresponding fastening component 126. In the embodiment, an inner diameter of each fastening hole H is designed to be larger than an outer diameter of the corresponding fastening component 126, so as to enable the knob 124 to move relatively to the rotation shaft 122 via a displacement of each fastening component 126 within the corresponding fastening hole H. By doing this, even if the knob 124 and the opening 112a of the casing 112 are imperfectly aligned with each other after the adjusting assembly 120 is assembled to the main body 110 of the projector 100, the knob 124 may be slid relatively to the rotation shaft 122 through a force applied by an user to be accurately aligned with the opening 112a, and the knob 124 is prevented from being interfered with the inner edge of the opening 112a.

Figure 5:
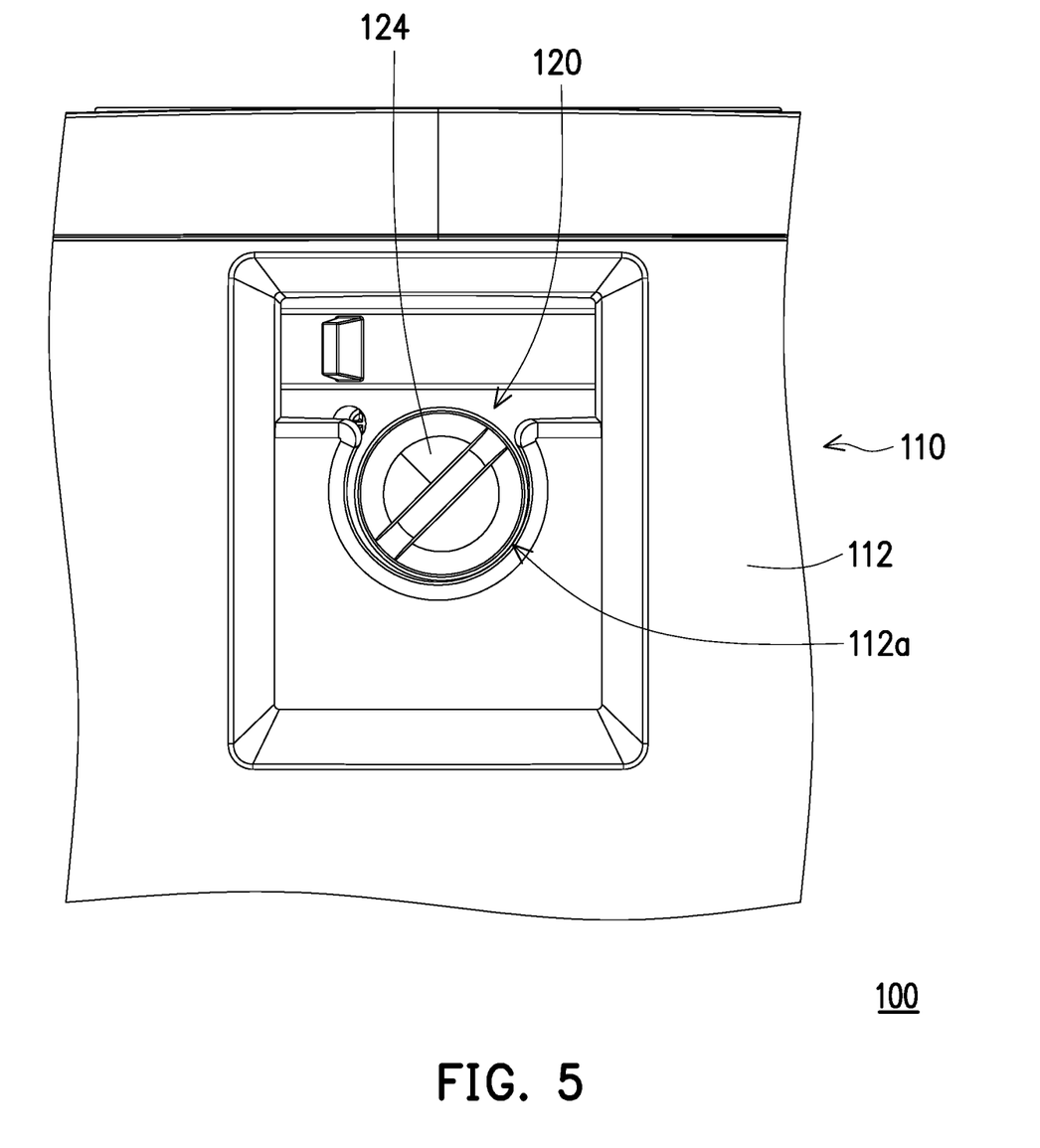
FIG. 5 illustrates the knob and the opening of FIG. 2 imperfectly aligned with each other.
Figure 6A:
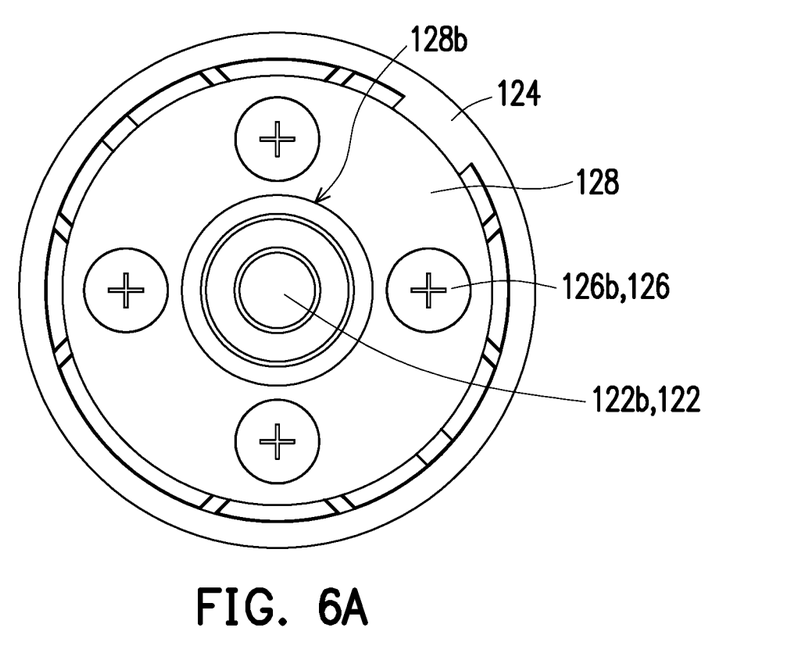
FIG. 6A is a bottom view of the adjusting assembly of FIG. 5.
Figure 6B:
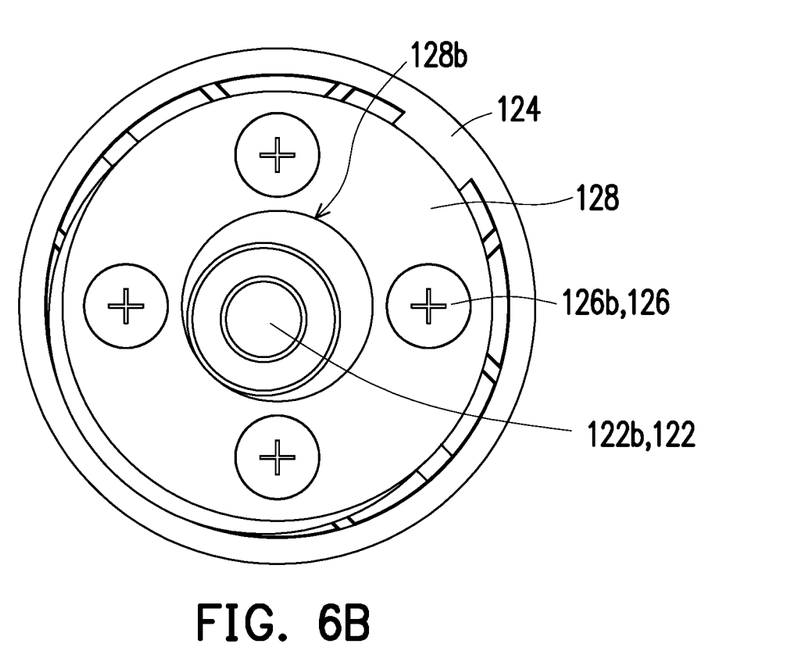
FIG. 6B is a bottom view of the adjusting assembly of FIG. 2.

FIG. 5 illustrates the knob and the opening of FIG. 2 imperfectly aligned with each other. FIG. 6A is a bottom view of the adjusting assembly of FIG. 5. FIG. 6B is a bottom view of the adjusting assembly of FIG. 2. Specifically, when the knob 124 and the opening 112a of the casing 112 are imperfectly aligned with each other as shown in FIG. 5, the knob 124 may be slid relatively to the rotation shaft 122 from the position shown in FIG. 6A to the position shown in FIG. 6B, such that the knob 124 is adjusted to be aligned accurately with the opening 112a as shown in FIG. 2.

Referring to FIG. 4, in the embodiment, each fastening component 126 is, for example, a screw and includes a screw portion 126a and a head portion 126b connected to each other. The rotation shaft 122 includes a assembling portion 122a and a shaft portion 122b connected to each other, the fastening holes H are formed on the assembling portion 122a of the rotation shaft 122, and the shaft portion 122b is connected to the main body 110 (shown in FIG. 1 and FIG. 2) of the projector 100. The screw portion 126a penetrates the corresponding fastening hole H and is screwed to the knob 124, and the assembling portion 122a of the rotation shaft 122 is position-limited by the head portion 126b. In other embodiment, the knob 124 may have at least one fastening hole (not shown), each fastening component 126 may penetrate the corresponding fastening hole of the knob 124 and be fixed to the rotation shaft 122, the screw portion 126a is screwed to the rotation shaft 122, and the knob 124 is position-limited by the head portion 126b, however the invention is not limited thereto.

In addition, the adjusting assembly 120 further includes at least one washer 128 (two washers 128 are shown in FIG. 4), and the washers 128 are disposed between the head portion 126b and the assembling portion 122a of the rotation shaft 122. Each washer 128 has a plurality of assembling holes 128a and a central hole 128b, the fastening components 126 penetrate the assembling holes 128a respectively to be screwed to the knob 124, and the shaft portion 122b of the rotation shaft 122 penetrates the central hole 128b to be connected to the main body 110 (shown in FIG. 1 and FIG. 2). In the embodiment, an inner diameter of the central hole 128b is larger than an outer diameter of the shaft portion 122b, so as to enable the washers 128 and the knob 124 to be fixed with each other to move relatively to the rotation shaft 122.

Figure 7:
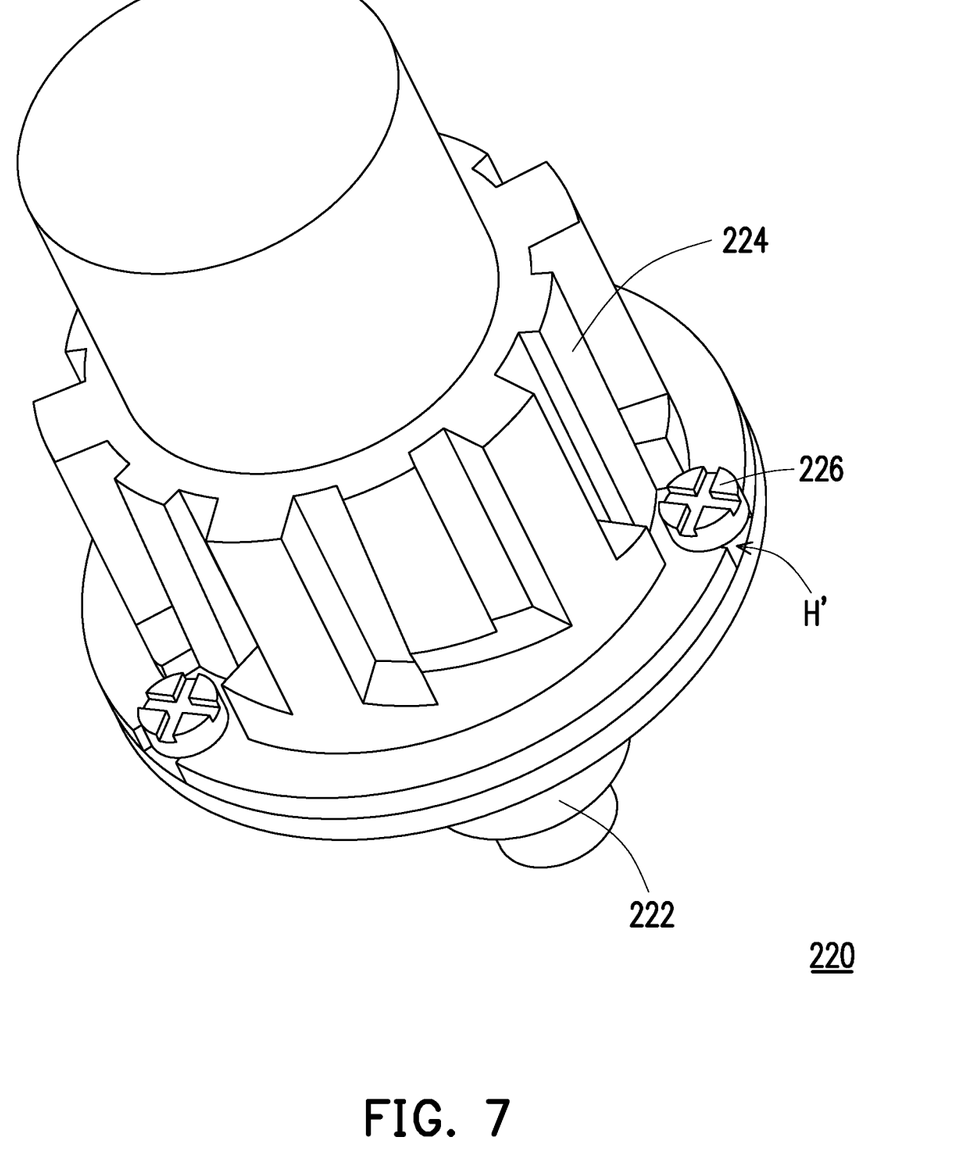
FIG. 7 is a schematic view of an adjusting assembly according to another embodiment of the invention.
Figure 8:
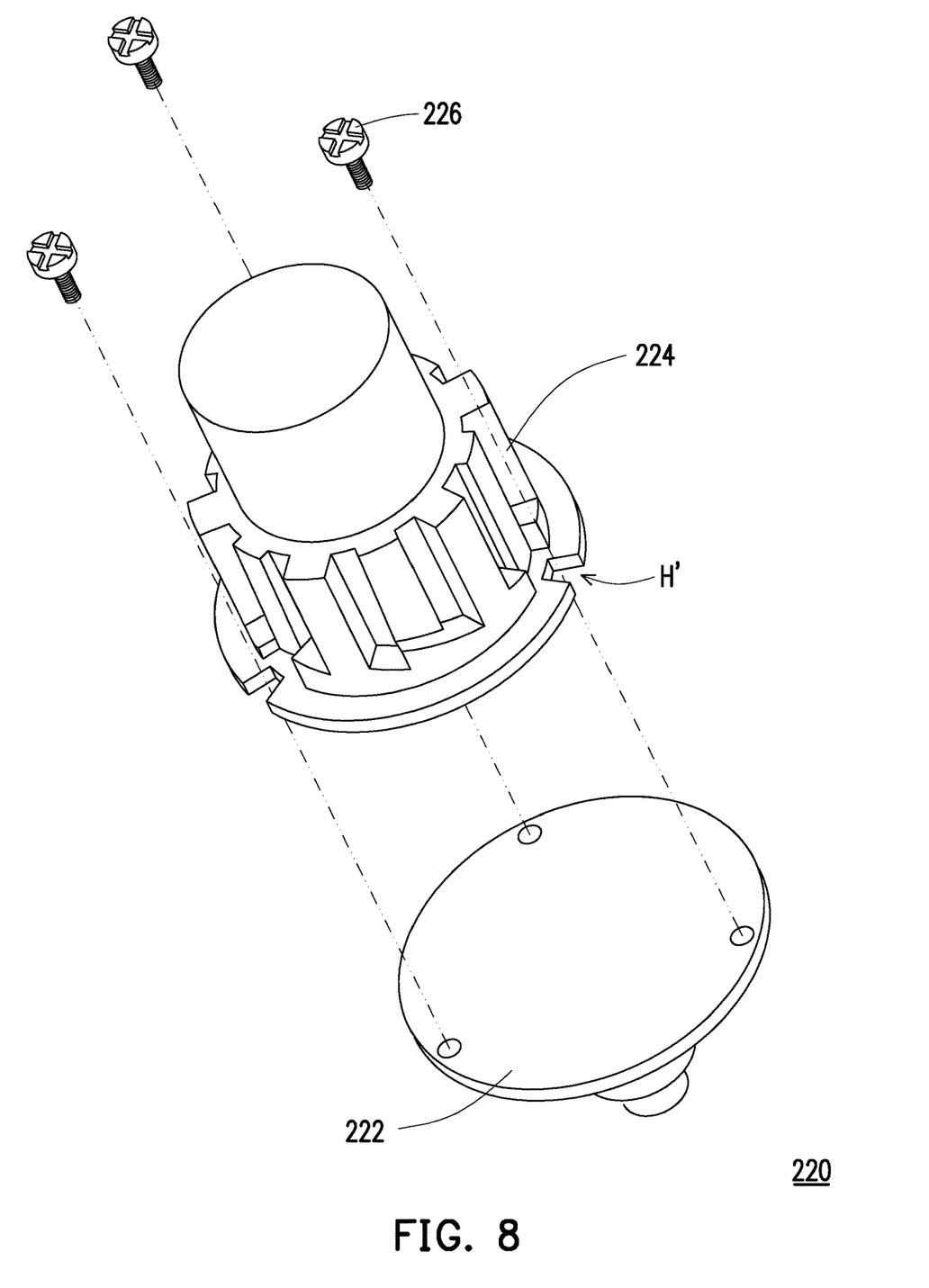
FIG. 8 is an exploded view of the adjusting assembly of FIG. 7.

In the above-mentioned embodiment, the fastening holes H and the fastening components 126 are covered by the knob 124 to be hidden, however the invention is not limited thereto. FIG. 7 is a schematic view of an adjusting assembly of another embodiment of the invention. FIG. 8 is an exploded view of the adjusting assembly of FIG. 7. In the adjusting assembly 220 of FIG. 7 and FIG. 8, the arrangement and operation of the rotation shaft 222, the knob 224, and the fastening components 226 are similar to the arrangement and operation of the rotation shaft 122, the knob 124, and the fastening components 126 of the above-mentioned embodiment. The difference between the adjusting assembly 220 and the adjusting assembly 120 is that, the fastening holes H' are formed on the knob 224, the fastening components 226 penetrate the fastening holes H' respectively to be fastened to the rotation shaft 222, and the fastening holes H' and the fastening components 226 are exposed by the knob 224.

In summary, in the adjusting assembly of the embodiment of the invention, the inner diameter of the fastening hole is designed to be larger than the outer diameter of the fastening component, so as to enable the knob to move relatively to the rotation shaft via a displacement of the fastening component within the fastening hole. By doing this, even if the knob and the opening of the casing are imperfectly aligned with each other after the adjusting assembly is assembled to the main body of the projector, the knob may be slid relatively to the rotation shaft through a force applied by an user to be accurately aligned with the opening, and the knob is prevented from being interfered with an inner edge of the opening.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:
1. A projector, comprising:
a main body, comprising:
a casing, having an opening;
a light source, disposed in the casing, and adapted to provide an illumination beam;
a light valve, disposed in the casing, located at a transmitting path of the illumination beam, and adapted to convert the illumination beam into an image beam; and
a projection lens, disposed in the casing, located at a transmitting path of the image beam, and adapted to project the image beam out of the projector; and
an adjusting assembly, comprising:
a rotation shaft, connected to the main body;
a knob, disposed on the rotation shaft and located in the opening, wherein one of the rotation shaft and the knob has at least one fastening hole; and
at least one fastening component, penetrating the at least one fastening hole and fixed to another one of the rotation shaft and the knob, wherein an inner diameter of the at least one fastening hole is larger than an outer diameter of the at least one fastening component, and wherein the at least one fastening component is configured to move in the at least one fastening hole along a direction perpendicular to the rotation shaft, so that the knob is moved along the direction perpendicular to the rotation shaft.

2. The projector according to claim 1, wherein the knob is adapted to move relatively to the rotation shaft via a displacement of the at least one fastening component within the at least one fastening hole.

3. The projector according to claim 1, wherein the rotation shaft is connected to the projection lens, and the knob is adapted to drive the rotation shaft to rotate, so as to adjust a position of the projection lens.

4. The projector according to claim 1, wherein the at least one fastening component penetrates the at least one fastening hole along a direction parallel to a rotation axis of the rotation shaft.

5. The projector according to claim 1, wherein the at least one fastening hole is formed on the rotation shaft, and the at least one fastening hole and the at least one fastening component are covered by the knob to be hidden.

6. The projector according to claim 1, wherein the at least one fastening hole is formed on the knob, and the at least one fastening hole and the at least one fastening component are exposed by the knob.

7. The projector according to claim 1, wherein the at least one fastening component comprises a screw portion and a head portion connected to each other, the screw portion is screwed to one of the rotation shaft and the knob, and another one of the rotation shaft and the knob is position-limited by the head portion.

8. The projector according to claim 7, wherein the screw portion is screwed to the knob, the rotation shaft is position-limited by the head portion, the adjusting assembly comprises at least one washer, and the at least one washer is disposed between the head portion and the rotation shaft.

9. The projector according to claim 8, wherein the at least one washer has at least one assembling hole, the at least one fastening component penetrates the assembling hole.

10. The projector according to claim 8, wherein the washer has a central hole, the rotation shaft comprises a shaft portion and an assembling portion connected to each other, the assembling portion is position-limited by the head portion, the shaft portion penetrates the central hole and is connected to the main body, and an inner diameter of the central hole is larger than an outer diameter of the shaft portion.

11. The projector according to claim 1, wherein a periphery of the knob is at least partially surrounded by an inner edge of the opening.

12. An adjusting assembly, comprising:
a rotation shaft;
a knob, disposed on the rotation shaft, wherein one of the rotation shaft and the knob has at least one fastening hole; and
at least one fastening component, penetrating the at least one fastening hole and fixed to another one of the rotation shaft and the knob, wherein an inner diameter of the at least one fastening hole is larger than an outer diameter of the at least one fastening component, and wherein the at least one fastening component is configured to move in the at least one fastening hole along a direction perpendicular to the rotation shaft, so that the knob is moved along the direction perpendicular to the rotation shaft.

13. The adjusting assembly according to claim 12, wherein the knob is adapted to move relatively to the rotation shaft via a displacement of the at least one fastening component within the at least one fastening hole.

14. The adjusting assembly according to claim 12, wherein the at least one fastening component penetrates the at least one fastening hole along a direction parallel to a rotation axis of the rotation shaft.

15. The adjusting assembly according to claim 12, wherein the at least one fastening hole is formed on the rotation shaft, and the at least one fastening hole and the at least one fastening component are covered by the knob to be hidden.

16. The adjusting assembly according to claim 12, wherein the at least one fastening hole is formed on the knob, and the at least one fastening hole and the at least one fastening component are exposed by the knob.

17. The adjusting assembly according to claim 12, wherein the at least one fastening component comprises a screw portion and a head portion connected to each other, the screw portion is screwed to one of the rotation shaft and the knob, and another one of the rotation shaft and the knob is position-limited by the head portion.

18. The adjusting assembly according to claim 17, wherein the screw portion is screwed to the knob, the rotation shaft is position-limited by the head portion, the adjusting assembly comprises at least one washer, and the at least one washer is disposed between the head portion and the rotation shaft.

19. The adjusting assembly according to claim 18, wherein the at least one washer has at least one assembling hole, the at least one fastening component penetrates the assembling hole.

20. The adjusting assembly according to claim 18, wherein the washer has a central hole, the rotation shaft comprises a shaft portion and an assembling portion connected to each other, the assembling portion is position-limited by the head portion, the shaft portion penetrates the central hole and is connected to the main body, and an inner diameter of the central hole is larger than an outer diameter of the shaft portion.

* * * * *